(12) United States Patent
Mason, Jr.

(10) Patent No.: US 8,358,750 B1
(45) Date of Patent: Jan. 22, 2013

(54) ELECTRONIC MESSAGE MANAGEMENT SYSTEM AND ASSOCIATED METHODS

(76) Inventor: Joseph M. Mason, Jr., Brooksville, FL (US)

( * ) Notice: Subject to any disclaimer, the term of this patent is extended or adjusted under 35 U.S.C. 154(b) by 409 days.

(21) Appl. No.: 12/603,054

(22) Filed: Oct. 21, 2009

Related U.S. Application Data

(60) Provisional application No. 61/107,139, filed on Oct. 21, 2008.

(51) Int. Cl.
*H04M 1/64* (2006.01)
*G06F 15/02* (2006.01)

(52) U.S. Cl. ........................ 379/88.11; 705/32

(58) Field of Classification Search .... 379/88.11–88.25, 379/114.01–114.03; 705/32; 709/204
See application file for complete search history.

(56) References Cited

U.S. PATENT DOCUMENTS

| | | | | |
|---|---|---|---|---|
| 5,528,670 A | * | 6/1996 | Elliot et al. | 379/88.25 |
| 2004/0107239 A1 | * | 6/2004 | Hasegawa et al. | 709/200 |
| 2005/0100151 A1 | * | 5/2005 | Lemchen et al. | 379/159 |
| 2009/0235275 A1 | * | 9/2009 | Brown et al. | 719/313 |
| 2010/0100463 A1 | * | 4/2010 | Molotsi et al. | 705/32 |

* cited by examiner

*Primary Examiner* — Mohammad Islam
(74) *Attorney, Agent, or Firm* — Allen, Dyer, Doppelt, Milbrath & Gilchrist, P.A.

(57) ABSTRACT

A system and method are provided for managing electronic data, in particular, telephone messages that include a time entry system that can be associated with multiple parties and are sortable in a plurality of fashions. Telephone messages can be logged, which automatically causes a telephone number in the database to be updated, and automatically accesses data related to the caller, including listing all matters associated with the caller. An action message can be attached to a telephone message, or an action message can be sent without the telephone message. If time is to be charged as a result of the message, the time can be logged into the system for one or a multiplicity of users. Instant messages can also be sent to other users of the system, and reports can be generated by date, client, matter, or name.

21 Claims, 15 Drawing Sheets

☐ SEND AN ACTION MESSAGE ☒

FROM: JIM

TO: TERRY

SUBJECT: PAPERS FOR YOU

CLIENT: JONES, SALLY

MATTER: MATTER 2

DATE FRI 01/30/2004   TIME (hh:mm AMPM) 01:23 PM

PRIORITY
○ HIGH  ● MEDIUM  ○ LOW

☐ FOR YOUR INFORMATION   ☐ PURSUANT TO YOUR REQUEST   ☐ IMMEDIATE ACTION
☐ PLEASE REVIEW AND CALL ME   ☐ FOR YOUR COMMENTS   ☐ COMPLETE AND RETURN
☐ AS WE DISCUSSED   ☐ FOR YOUR APPROVAL   ☐ COMPLETE AND FORWARD

MESSAGE:
PLEASE PICK-UP THE PAPERS FOR ME THE NEXT TIME YOU GO TO THE COURT HOUSE|

SEND   ☑ CLOSE ON SEND

PHONE MESSAGES FOR JIM

PRINT DATE
04/26/2004 1:38PM

DATE/TIME: 04/26/2004 01:01 PM
FROM: JOE BARRY
SUBJECT: SIGNING PAPERS
CLIENT: ACNE POWDER COMPANY
MATTER: HOUSE SELLING
PHONE
DAY: 456 789-4561
EVE: 589-985-7895
FAX:
CELL:
ALT: 456 785 1258

TAKEN BY:

| XCALLED | WILL CALL BACK |
| RETURNED CALL | CAME BY |
| XPLEASE CALL | WANTS TO MEET |

RESOLVED: 4/26/04
BILLABLE HOURS: 0.10
BILLED: 4/25/04 12:00:00 AM

MESSAGE: MR. BARRY WOULD LIKE YOU TO CALL HIM AND LET HIM KNOW WHEN HE CAN SIGN THE PAPERS.
RESOLUTIONS: NO ANSWER @04/26/04 01:06 PM
OUT - LEFT MSG @04/26/04 01:07 PM
RETURNED CALL @04/26/04 02:07 PM. INSTRUCTED HIM TO COME IN TOMORROW AT 9:00

BILLING DETAILS

| DATE | NAME | BILLABLE HOURS | COMMENTS |
|---|---|---|---|
| 04/26/2004 | JIM | 0.10 | |
| TOTAL BILLABLE HOURS | | 0.10 | |

FIG. 11

PRINT DATE: 02/23/03  9:24AM

PHONE DATE: 1/23/03  3:09 PM
BILLED: NO

BILL DUE:

PHONE TO: JIM
PHONE FROM: BARRY, GEORGE
PHONE SUBJECT: PAPERS FOR YOU
ABACUS CLIENT: JONES, SALLY
ABACUS MATTER: MATTER 2

| DATE | HOURS |
|------|-------|
| 01/28/03 | 0.50 |
| 02/23/03 | 0.40 |
| 02/23/03 | 1.00 |
|  | 1.90 |

| NAME | COMMENT |
|------|---------|
| JIM | CALLED BACK, DISCUSSED PAPERWORK |
| TERRY | PULLING REVIEWING FILES |
| LORI | GOING TO COURTHOUSE |

FIG. 12

BILLING SUMMARY REPORT                                    PRINT DATE: 02/23/03 9:25:42 AM

ABACUS CLIENT: JONES, SALLY          DAY PHONE: (211)361-1234
ABACUS MATTER: MATTER 2
DATE              TO        FROM:          PHONE SUBJECT    RESOLVED  BILLED    HOURS BY HOURS  BILLING COMMENTS
01/23/03 3:09 PM  JIM       BARRY, GEORGE  PAPERS FOR YOU             01/28/03  JIM   0.50      CALLED BACK, DISCUSSED PAPERWORK
01/23/03 3:09 PM  JIM       BARRY, GEORGE  PAPERS FOR YOU             02/23/03  TERRY 0.40      PULLING, REVIEWING FILES
01/23/03 3:09 PM  JIM       BARRY, GEORGE  PAPERS FOR YOU             02/23/03  LORI  1.00      GOING TO COURTHOUSE

ABACUS CLIENT: MACLEAN, TERRY        DAY PHONE:
ABACUS MATTER:
DATE              TO        FROM:          PHONE SUBJECT    RESOLVED  BILLED    HOURS BY HOURS  BILLING COMMENTS
12/03/03 7:46 AM  JIM       MACLEAN, TERRY NEW UP/DOWN ARROWS TO ADD
                                           BILL HOURS

96

FIG. 13

ELECTRONIC MESSAGE MANAGEMENT SYSTEM AND ASSOCIATED METHODS

CROSS-REFERENCE TO RELATED APPLICATION

This applications claims the benefit of U.S. Provisional Application Ser. No. 61/107,139, filed on Oct. 21, 2008, the contents of which application are herein incorporated by reference in their entirety.

FIELD OF THE INVENTION

The present invention relates to systems and methods for managing electronic data, and, more particularly, to such systems and methods for managing telephone message data.

BACKGROUND OF THE INVENTION

The volume of electronic and voice messages in today's business world can become overwhelming, and there is a great risk of misplacing and/or misfiling messages, which can lead to disastrous consequences, especially in certain fields such as the law.

Therefore, it would be beneficial to provide and system and method for managing voice and electronic mail that would help ensure that the messages reach the correct recipient(s), and that the messages be catalogued and attended to properly and in a timely fashion.

SUMMARY OF THE INVENTION

The present invention is directed to a system and method for managing electronic data, in particular, telephone messages. The system further comprises a time entry system that can be associated with multiple parties and are sortable in a plurality of fashions.

In a first application of the system, telephone messages can be logged, which automatically causes a telephone number in the database to be updated, and automatically accesses data related to the caller, including listing all matters associated with the caller.

In another application of the system, an action message can be attached to a telephone message, or an action message can be sent without the telephone message. If time is to be charged as a result of the message, the time can be logged into the system for one or a multiplicity of users.

Instant messages can also be sent to other users of the system, and reports can be generated by date, client, matter, or name.

According to an embodiment of the present invention, a system for electronic telephone message management comprises at least one processor in communication with machine-readable memory configured to execute a plurality of functional modules. The modules include a telephone message data entry module adapted to display message data entry fields and receive message data therein, a telephone message data routing module adapted to route the received message data to message recipients, and a message recipient response module adapted to display response options associated with the received message data and receive selections of the response options.

According to a method aspect, a computer-based method for telephone message management comprises displaying a telephone message data entry screen to a telephone answerer, including a plurality of message data entry fields, and receiving message data entered in the message data entry fields, one of the message data entry fields indicating a message recipient, and storing the received message data. The stored message data is routed and displayed to the message recipient, as are a plurality of message response options. A selection by the message recipient is received from among the message response options.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

Figure 1:
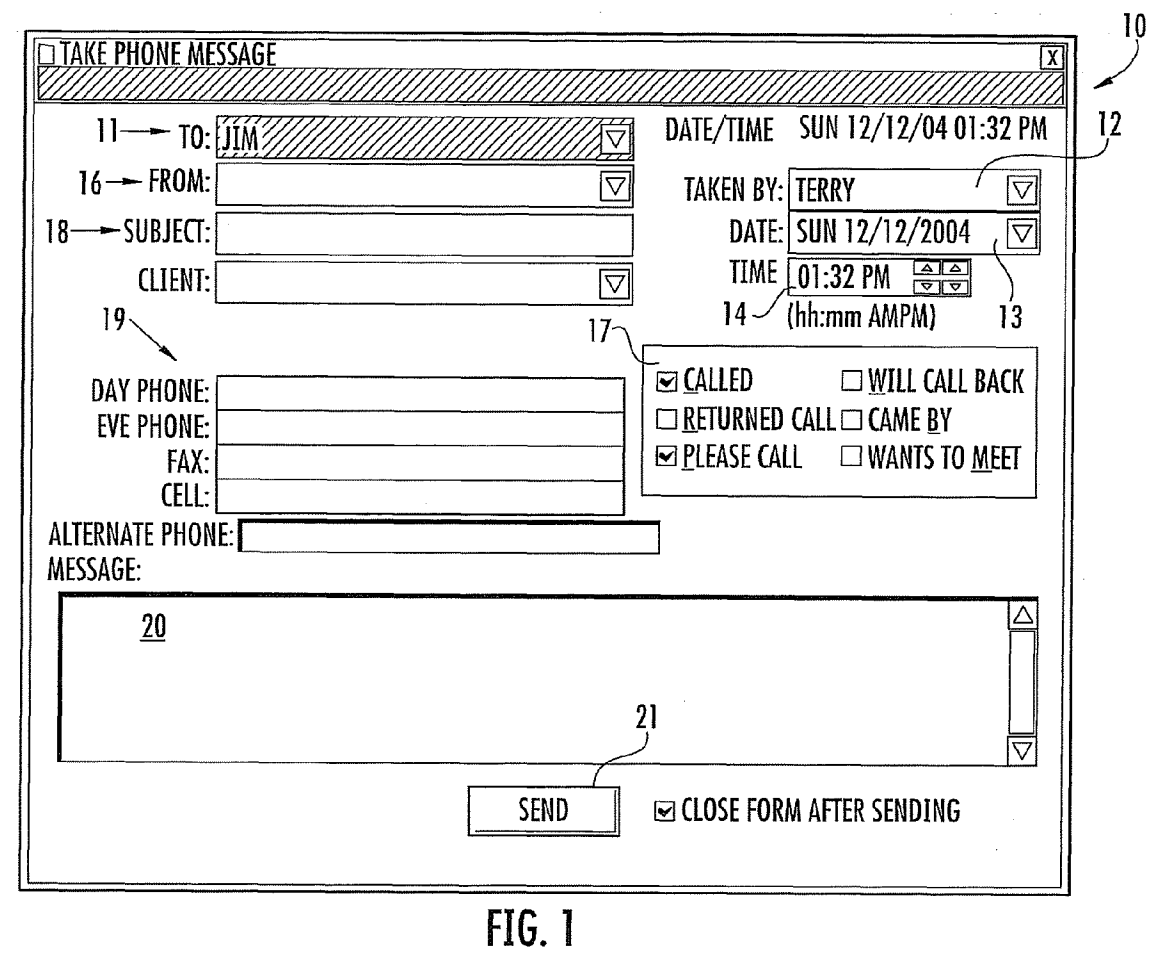

FIG. 1 is an exemplary screen for taking a telephone message.

FIG. 2 is an exemplary screen for reading a message.

FIG. 6 is an exemplary screen for sending an action message.

FIG. 7 is an exemplary screen for searching.

FIG. 10 is an exemplary screen for displaying resolutions.

FIG. 11 is an exemplary screen for displaying a report.

FIG. 12 is an exemplary screen for displaying billing details.

FIG. 13 is an exemplary screen for displaying a billing summary report.

DETAILED DESCRIPTION OF PREFERRED EMBODIMENTS

Figure 3:
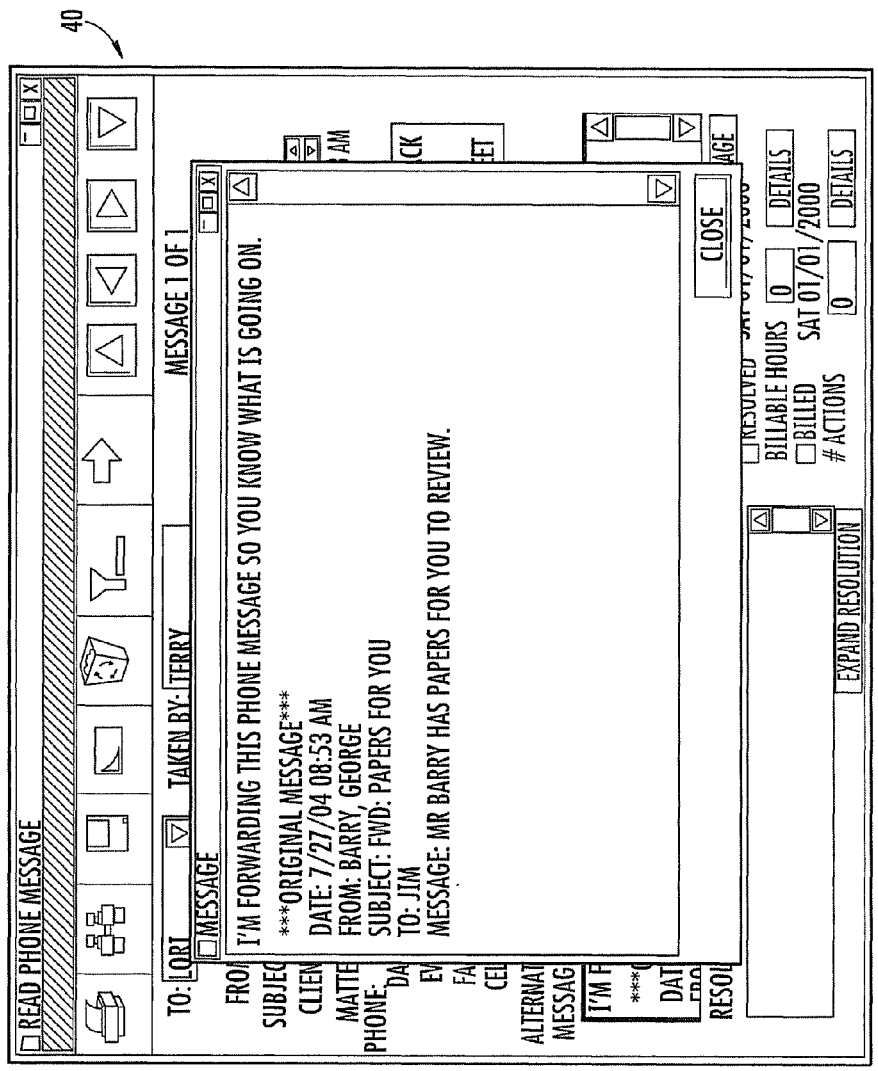
FIG. 3 is an exemplary screen for forwarding a message.
Figure 4:
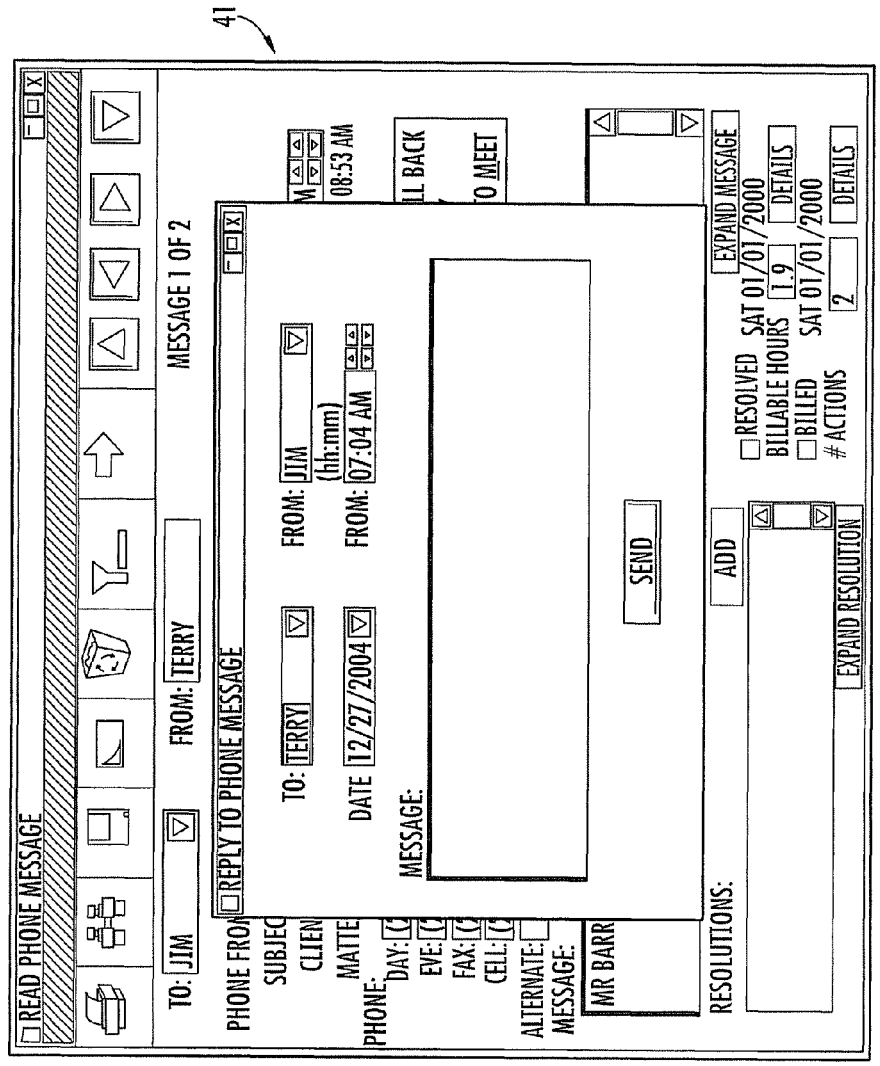
FIG. 4 is an exemplary screen for replying to a message.
Figure 5:
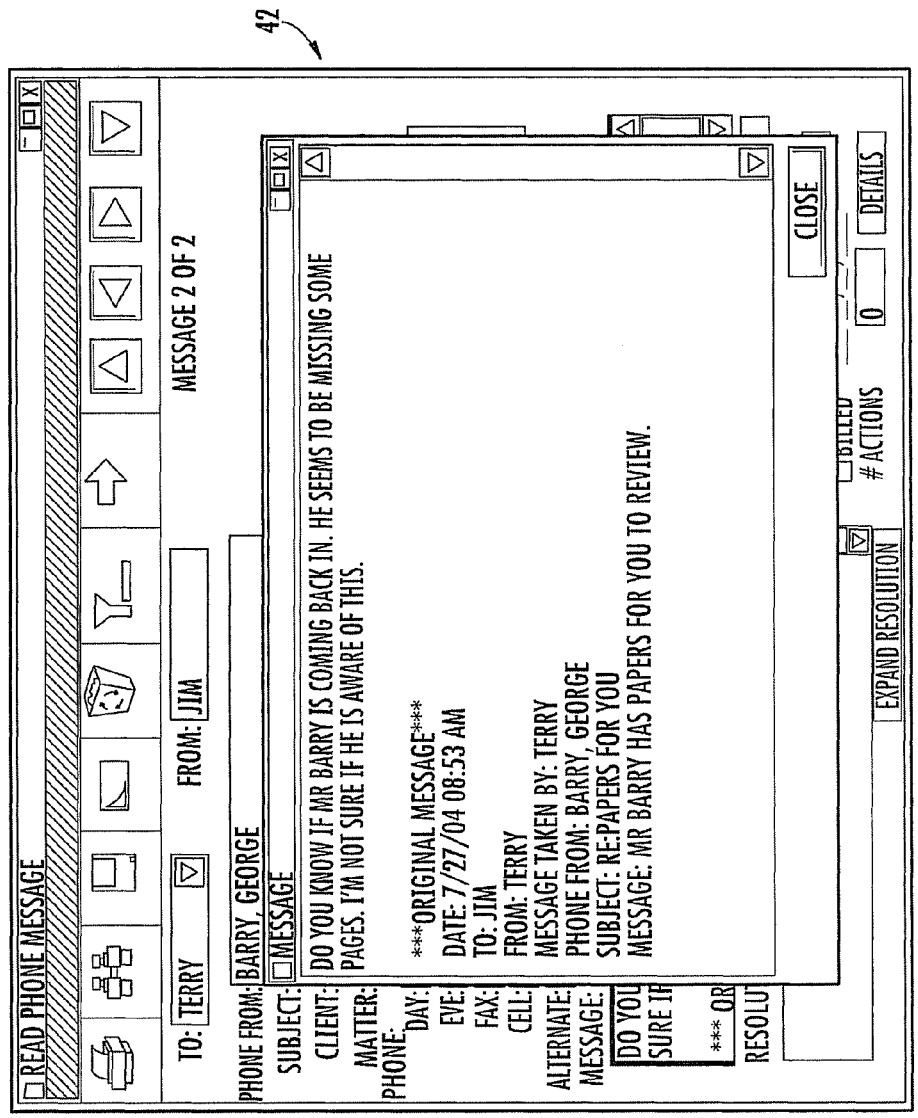
FIG. 5 is an exemplary screen for displaying a message containing a reply.

A description of the preferred embodiments of the present invention will now be presented with reference to FIGS. 1-13.

The system of the present invention assists in managing telephone messages, for example, although this is not intended as a limitation. When a caller reaches a telephone answerer, for example, a receptionist, a screen 10 such as that in FIG. 1 can be opened. Drop-down lists are available for intended recipient 11, message taker 12, date 13, time 14, caller 15, and client 16. A check-list 17 such as known in physical message pads is provided for items such as "called," "returned call," etc. Entry boxes are also available for subject 18, contact numbers 19, and the message 20. The recipient 11, message taker 12, date 13, and time 14 entries can be programmed to default values, which can be overwritten by the user. Preferably, the "caller" 15 list will automatically begin offering choices when the user begins entering a name, wherein these names are accessed in a firm database. When a name is selected from this list, the database also automatically populates the contact numbers 19, which can be updated if desired, and further populates the client's matters, from which can be selected a particular matter about which the call is being placed. Clicking on the "send" button 21 directs the message to the selected recipient 11.

Figure 2:
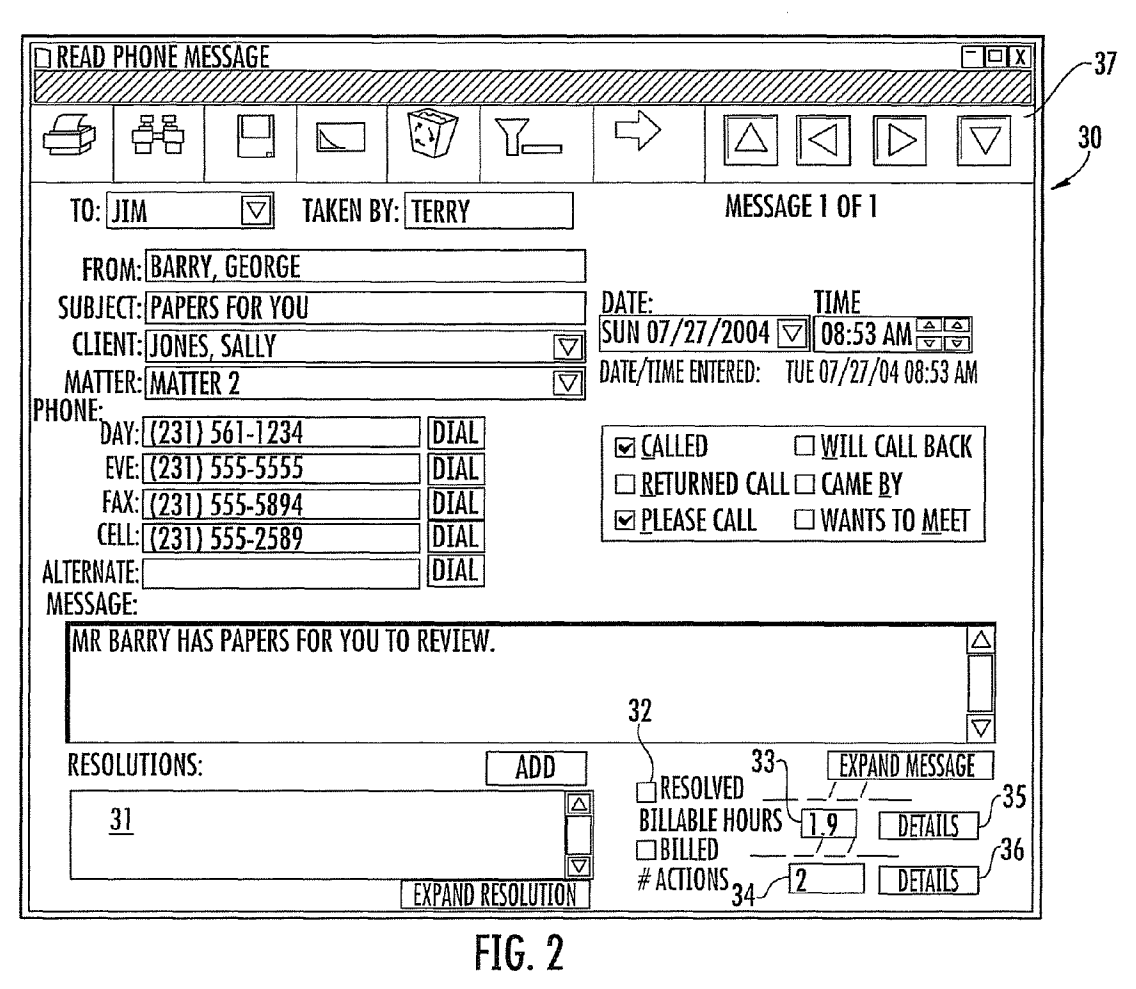

A recipient can read a message via a screen 30 such as in FIG. 2. The elements entered on the previous screen 10 are reproduced. In addition, this screen 30 contains a box 31 into which can be entered a "resolution," and also whether the issue was resolved 32, a time entry 33, and a number of actions 34. Additional details can be presented on the time entry 33 and number of actions 34 by clicking on the respective "details" button 35,36.

Messages can be displayed and reviewed in a plurality of ways, by selecting from a tool bar 37. Among the actions are "next," "previous," "first," "last," "reply," "forward," "search," and "print." An exemplary forwarding screen 40 is shown in FIG. 3; a screen 41 for replying, in FIG. 4; and a message containing a reply 42, in FIG. 5. In addition, the message can be attached to an action by selecting the "respond" button and selecting from a drop-down menu, which sends an action message to another user with the current message appended thereto. This feature is illustrated in the screen 43 of FIG. 6, which reproduces the data entered in FIG. 1, sets a priority 44, and offers a selection of action types 45, along with a message box 46.

Figure 7:
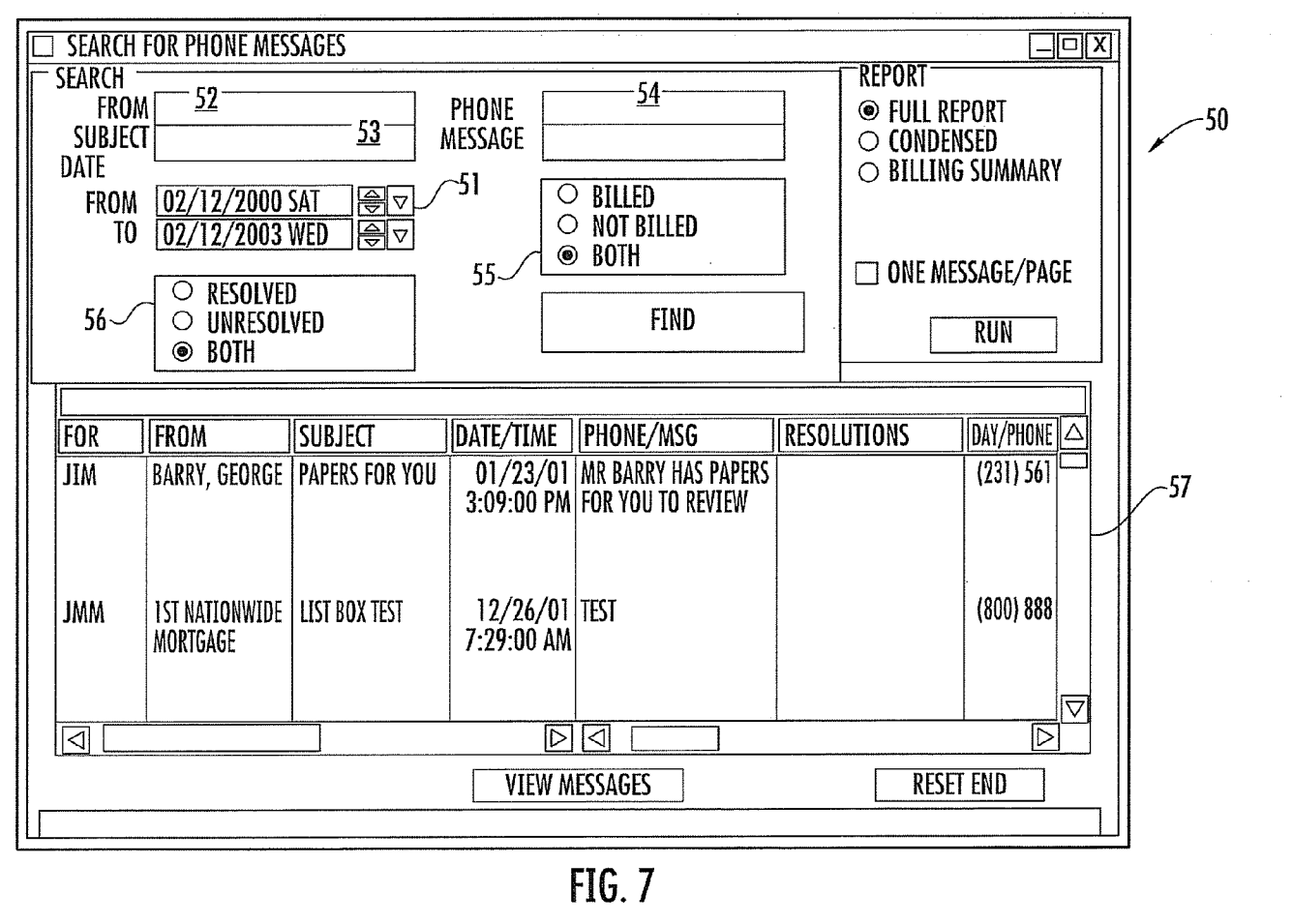

Searching can also be performed, as illustrated in the screen 50 of FIG. 7. As shown, searching can be done using a number of criteria, such as, but not intended to be limited to, date range 51, party 52, subject 53, phone number (total or partial) 54, whether billed or not 55, and whether resolved or not 56. A report screen 57 is then presented.

Figure 8:
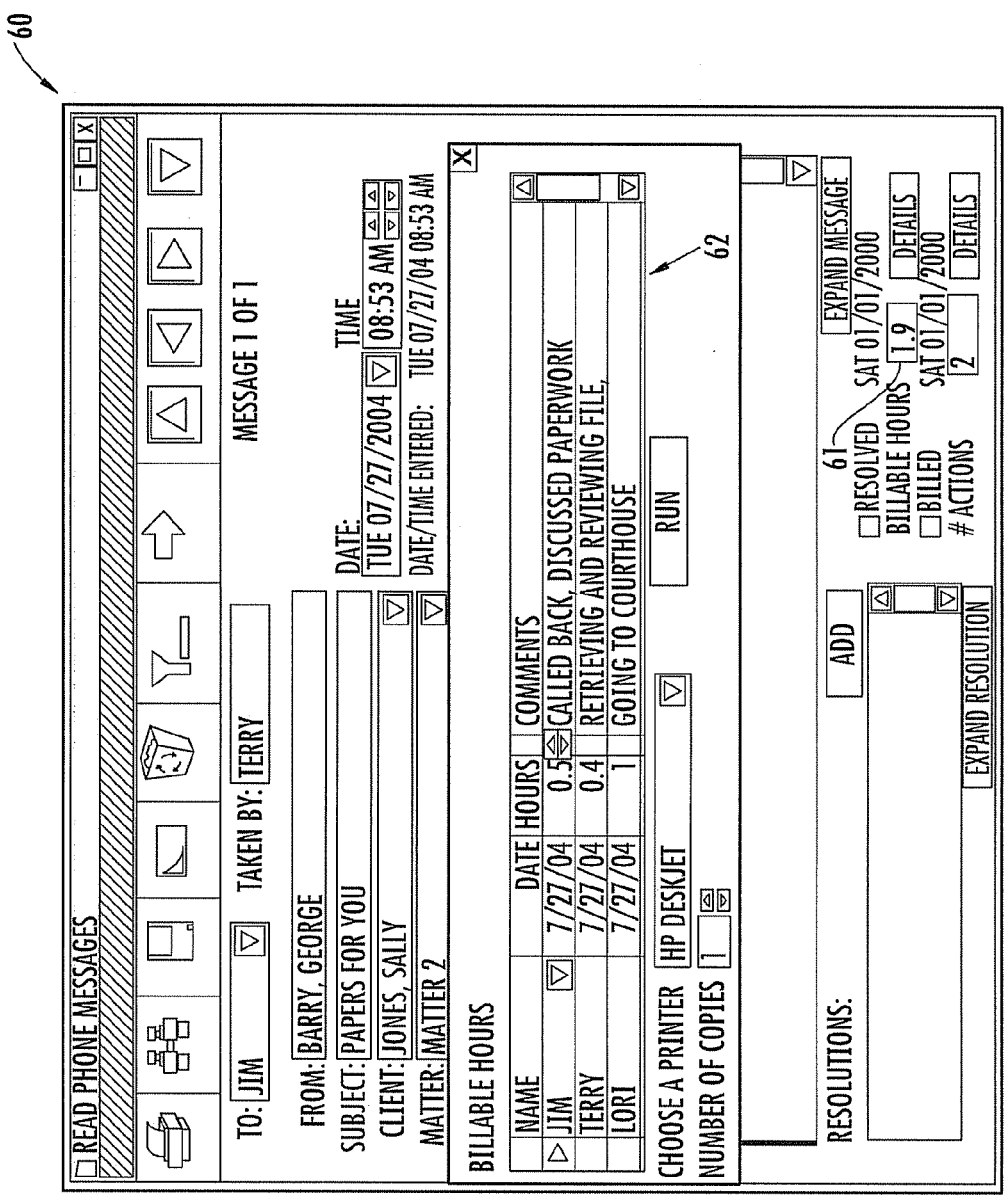
FIG. 8 is an exemplary screen for recording billable hours.

Billable hours can be recorded on a screen 60 such as in FIG. 8. The time is entered 61 for and by each person concerned with the subject message, and a listing thereof can be presented 62.

Figure 9:
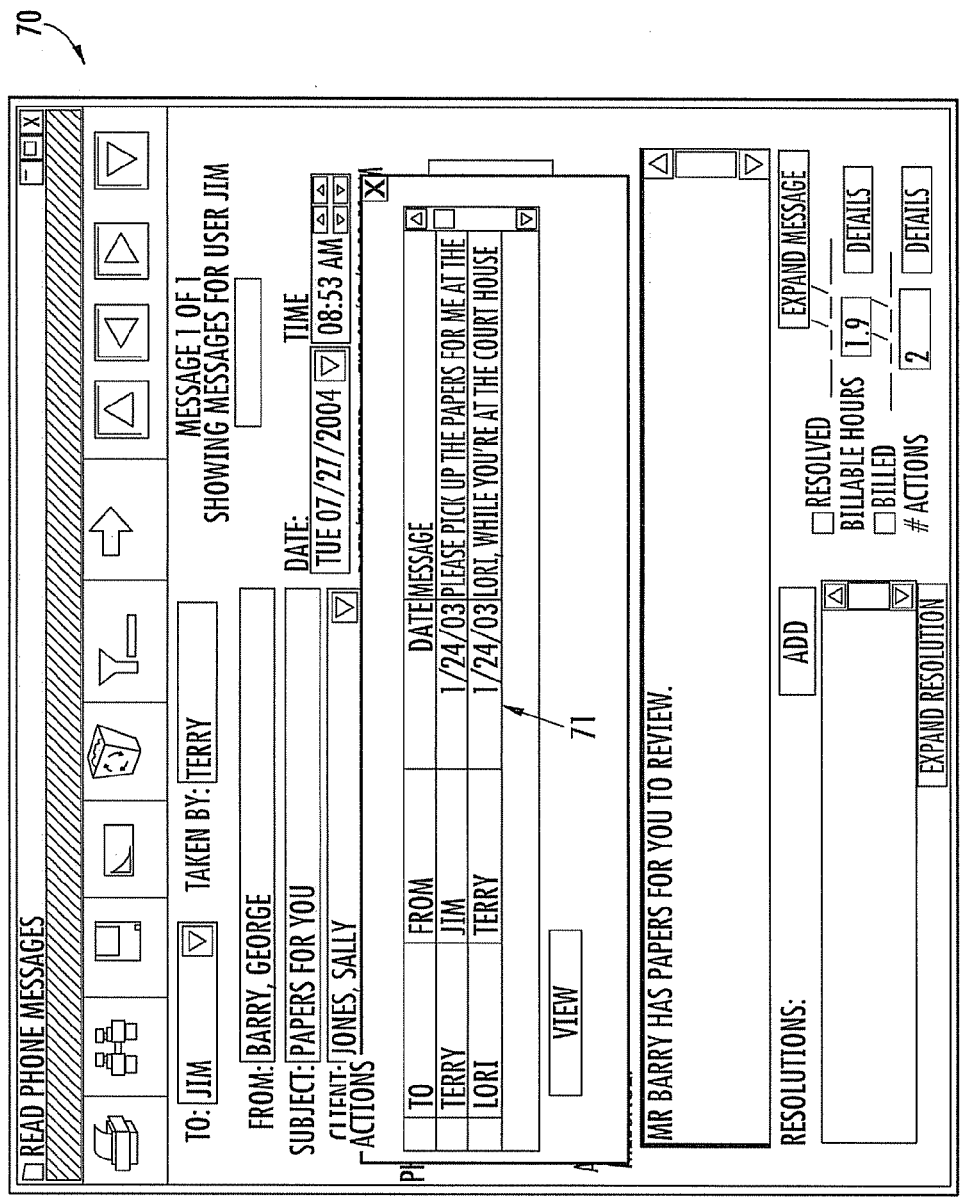
FIG. 9 is an exemplary screen for displaying all action messages associated with a phone message.

If the "details" button 36 next to the number of actions associated button 34 is selected on the message reading screen 30 (FIG. 2), a screen 70 such as in FIG. 9 appears. Here a grid 71 is displayed showing all the action messages associated with the subject phone message.

Figure 10:
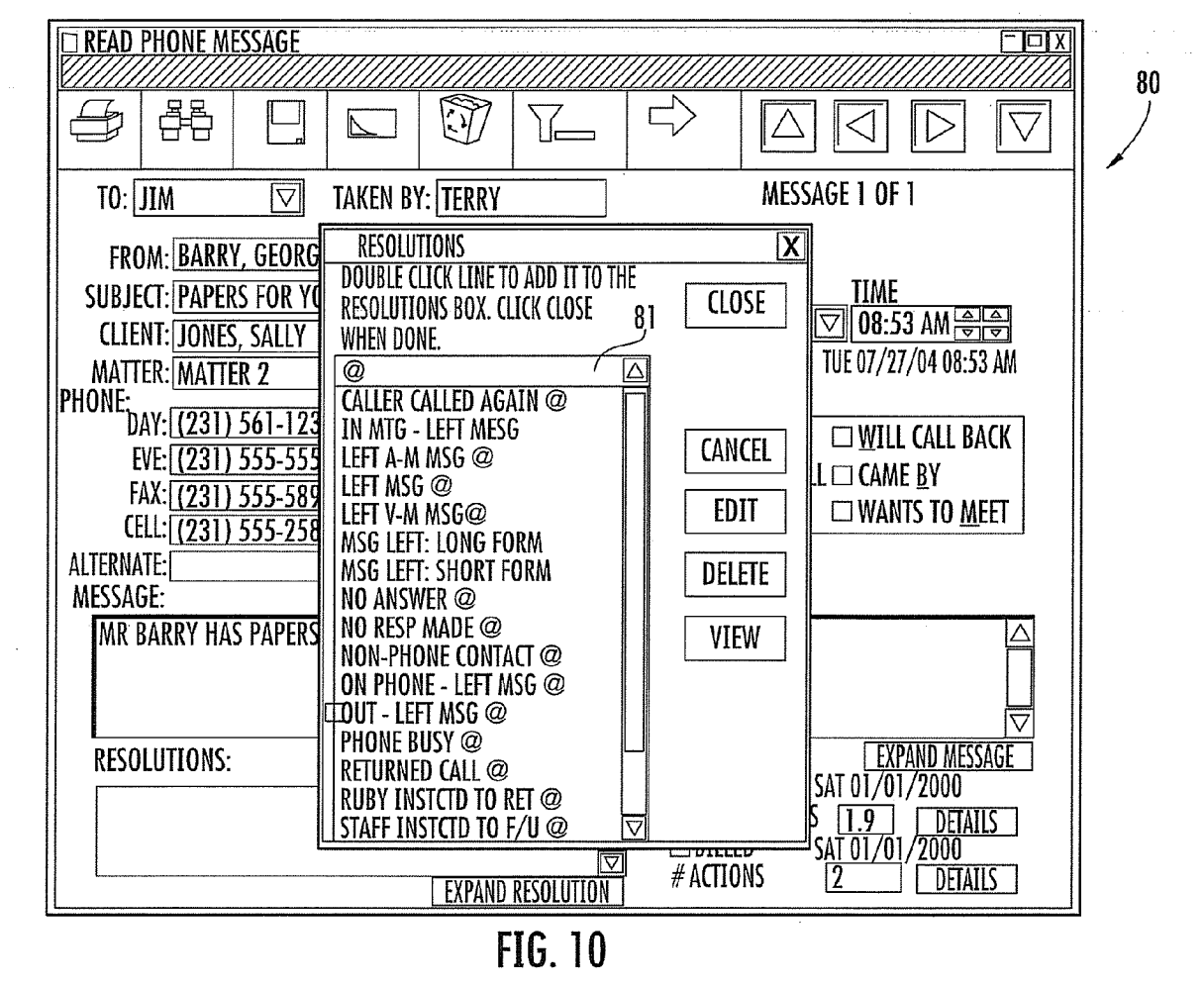

Resolutions can also be displayed as illustrated in the screen 80 of FIG. 10, which can be added to or edited as desired. Each of these items 81 is followed by an "@" sign, after which a timestamp is added by the system.

The system further permits messages to be emailed, which are formatted as reports and exported via the emailing application connected to the system.

A full report can also be prepared for a user, such as that 90 of FIG. 11, which summarizes the message 91 and the resolution 92 if any. Billing details can also be displayed on a screen 95 (FIG. 12) that are matched to a phone message, and a billing summary report 96 can be requested (FIG. 13).

Another feature includes a "filter," which can sort by such criteria as "all," "billed," "not billed," "resolved," "not resolved," and "recycle."

The internal email, acts in message, and screen message modules have essentially the same functionality as the telephone message module. Messages in all modules are archived, and remain searchable until deleted.

It can be seen that the present invention greatly facilitates the managing of telephone messages, and diminishes the chance that a message will be misdirected, lost, or ignored.

Figure 14:
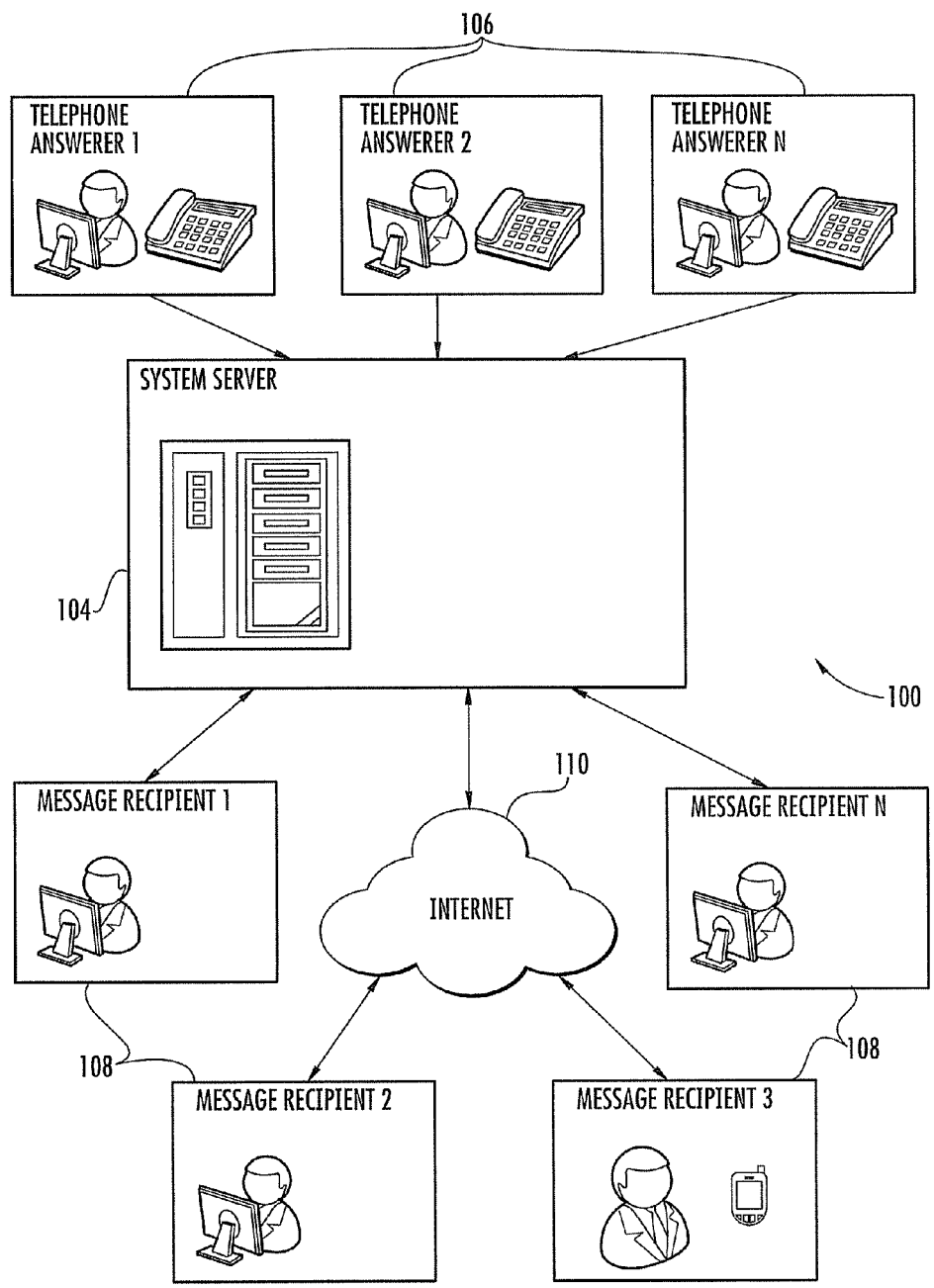
FIG. 14 is an overview of a message management system, according to an embodiment of the present invention.

It will be appreciated that various hardware and software implementations of the present invention are possible within the scope of the present invention. According to an illustrative embodiment, referring to FIG. 14, a system 100 for electronic telephone message management includes a system server 104, having at least one processor with associated machine-readable memory, that communicates with one or more telephone answerers 106 and message recipients 108, either directly, through a local area network or through a wide area network such as the Internet 110.

The system 100 can also employ back-up parallel and back-up servers as required or desired, and need not necessarily employ a single centralized server 104, but can utilize a de-centralized work model, with tasks allocated to various networked processors.

The telephone answerers 106 and message recipients 108 are equipped with personal computers, workstations, personal electronic devices or other electronic devices that are equipped to accept data entry and display data to their respective users. The present invention is not necessarily limited to any particular type or number of electronic device.

Figure 15:
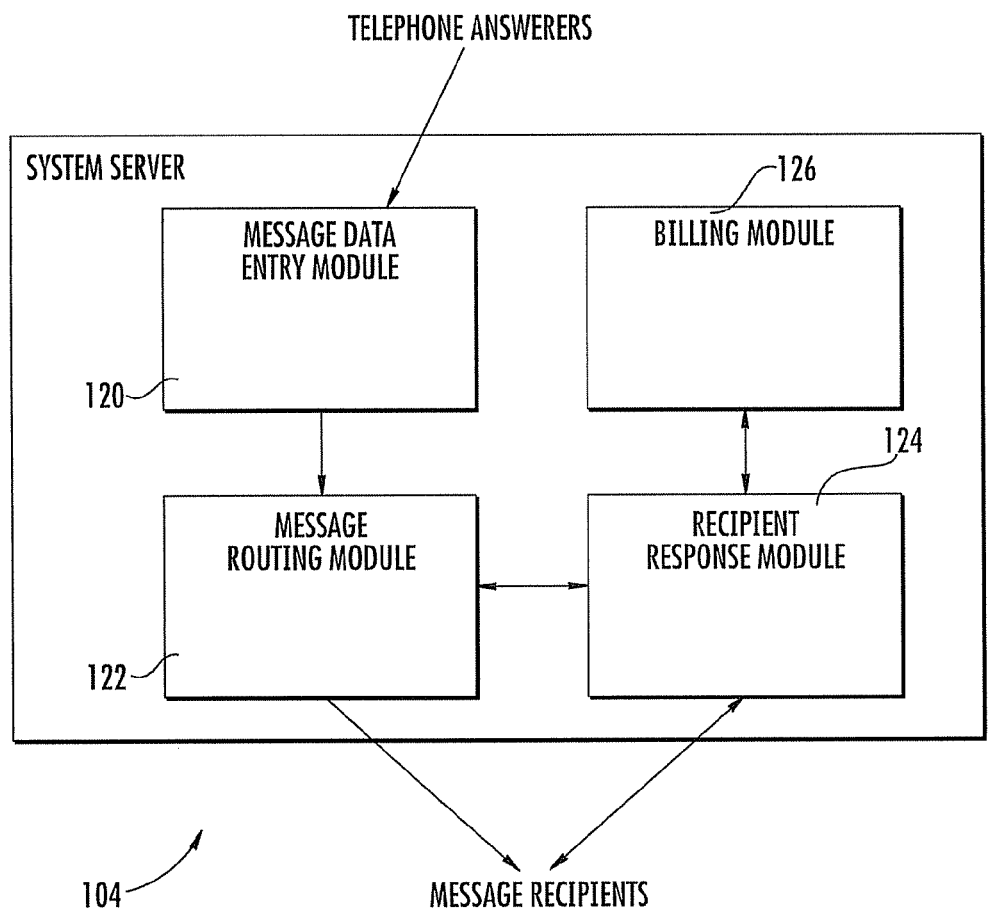
FIG. 15 is an overview of functional modules executed by components of the system of FIG. 14.

Referring to FIG. 15, the processor and memory of the server 104 are configured to execute a plurality of functional modules including a message data entry module 120, a message routing module 122, a recipient response module 124 and a billing module 126 adapted to perform the steps described above in connection with FIGS. 1-13.

For example, the telephone message data entry module 120 is adapted to display message data entry fields and receive message data therein. This can include automatically populating data entry fields with stored information associated with the caller and allowing that stored information to be updated.

The telephone message data routing module 122 is adapted to route the received message data to message recipients. This can include routing the received message data to one or more initial recipients after initial entry, as well as routing to subsequent recipients in connection with forwarding, reply and action selections.

The message recipient response module 124 is adapted to display response options associated with the received message data and receive selections of the response options. These response options can include associating a resolution with the message, forwarding the message to another recipient (or replying to a forwarded message), associating an action with the message data (and sending a corresponding action message), and associating time with the message data.

The billing module 126 is adapted to track billable time (as well as any non-billable time) associated with the received message data. The billing module 126 can be further adapted to generate billing reports, as described above.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system and method illustrated and described herein are by way of example, and the scope of the invention is not limited to the exact details of organization and use.

What is claimed is:

1. A computer-based method for telephone message management, the method comprising:

displaying a telephone message data entry screen to a telephone answerer, including a plurality of message data entry fields; receiving message data entered in the message data entry fields, one of the message data entry fields indicating a message recipient, and wherein the receiving message data entered in the message data entry fields further includes automatically populating additional message data entry fields upon identifying the caller; storing the received message data; routing the stored message data to the message recipient; displaying the stored message data to the message recipient, wherein displaying the stored message data to the message recipient includes allowing the message recipient to select for which of a plurality of messages the received message data is to be displayed; displaying a plurality of message response options to the message recipient, wherein the response options include association of the billable time with the received message; receiving a selection from among the message response options by the message recipient; and associating billable time with the stored message data.

2. The method of claim 1, wherein the plurality of message data entry fields include at least one of: a drop-down list, a check-list and a data entry box.

3. The method of claim 2, wherein the plurality of message data entry fields include a plurality of drop-down lists including intended recipient, message taker, date, time, caller and client drop-down lists.

4. The method of claim 2, wherein the check-list includes called, returned call, please call, will call hack, came by and wants to meet selections.

5. The method of claim 2, wherein the plurality of message data entry fields include a plurality of data entry boxes including subject, contact number and message boxes.

6. The method of claim 1, wherein another one of the message data entry fields indicates a caller.

7. The method of claim 1, wherein the additional message data entry fields automatically populated include a contact number field and a client field.

8. The method of claim 1, wherein routing the stored message data to the message recipient occurs subsequent to receiving a send selection from the telephone answerer.

9. The method of claim 1, wherein received message data is stored corresponding to a plurality of messages for the message recipient.

10. The method of claim 1, wherein displaying the stored message data to the message recipient includes receiving a search term from the message recipient and searching the stored message data using the search term.

11. The method of claim 1, wherein the plurality of response options include forwarding the stored message data to another message recipient, associating an action with the stored message data, and associating a resolution with the stored message data.

12. The method of claim 11, wherein displaying the stored message data to the message recipient further includes displaying all actions previously associated with the stored message data to the message recipient.

13. The method of claim 1, further comprising displaying a report of billable time associated with the stored message data.

14. The method of claim 1, wherein associating billable time with the stored message data includes associating billable time from a plurality of events.

15. A system for electronic telephone message management, the system comprising: at least one processor in communication with machine-readable memory configured to execute: a telephone message data entry module adapted to display message data entry fields and receive message data therein, wherein the receiving message data entered in the message data entry fields further includes automatically populating additional message data entry fields upon identifying the caller; a telephone message data routing module adapted to route and display the received message data to message recipients, wherein displaying the message data to the message recipient includes allowing the message recipient to select for which of a plurality of messages the received message data is to be displayed; a message recipient response module adapted to display response options associated with the received message data and receive selections of the response options, wherein the response options include association of the billable time with the received message; and a billing module adapted to track billable time associated with the received message data.

16. The method of claim 15, wherein the response options include association of the billable time for a plurality of events with the received message data.

17. The system of claim 15, wherein the telephone message data entry module is further adapted to automatically populate a portion of the message data entry fields upon receipt of message data in another one of the message data entry fields.

18. The system of claim 15, wherein telephone message data routing module adapted to route the received message to data to an initial message recipient and to a subsequent message recipient selected by the initial message recipient.

19. The system of claim 18, wherein the response options include selection of subsequent message recipient.

20. The system of claim 15, wherein response options include selection of a subsequent message recipient, association of the received message data with an action, and association of the received message data with a resolution.

21. The system of claim 20, wherein the message recipient response module is further adapted to display all actions and resolutions associated with the received message data.

\* \* \* \* \*